United States Patent [19]
Hitchcock

[11] 3,747,148
[45] July 24, 1973

[54] FOLDING BOOM ASSEMBLY

[76] Inventor: Kenneth O. Hitchcock, Hitchcock Inc., Burlington, Colo.

[22] Filed: Aug. 24, 1971

[21] Appl. No.: 174,376

[52] U.S. Cl............................ 74/101, 182/2, 172/126
[51] Int. Cl. ............................................. F16h 21/44
[58] Field of Search.................... 74/101; 172/126; 182/2; 214/1 CM, 147 R, 144

[56] References Cited
UNITED STATES PATENTS

| | | | |
|---|---|---|---|
| 2,175,282 | 10/1939 | Cormany | 172/126 |
| 2,828,679 | 4/1958 | Hansen | 172/126 |
| 3,072,200 | 1/1963 | Yerkes | 172/126 |
| 3,224,528 | 12/1965 | Hubbard | 182/2 |
| 3,411,606 | 11/1968 | Oldakowski et al. | 182/2 |
| 3,414,136 | 12/1968 | Moore et al. | 214/1 CM |
| 3,589,134 | 6/1971 | Hackmann | 214/1 CM |

Primary Examiner—Manuel A. Antonakas
Assistant Examiner—Wesley S. Ratliff, Jr.
Attorney—Burd, Braddock & Bartz

[57] ABSTRACT

A folding boom assembly having three articulately connected boom sections that are movable from a generally horizontal, aligned position to a generally upright, side-by-side position. The adjacent ends of the boom sections are pivotally connected together. A power transmitting mechanism having a first elongated flexible member connects the first boom section with the second boom section and a second elongated member connects the first boom section with the third boom section. A hydraulic motor operates with the power transmitting mechanism to control the folding and unfolding of the boom sections of the boom assembly.

29 Claims, 6 Drawing Figures

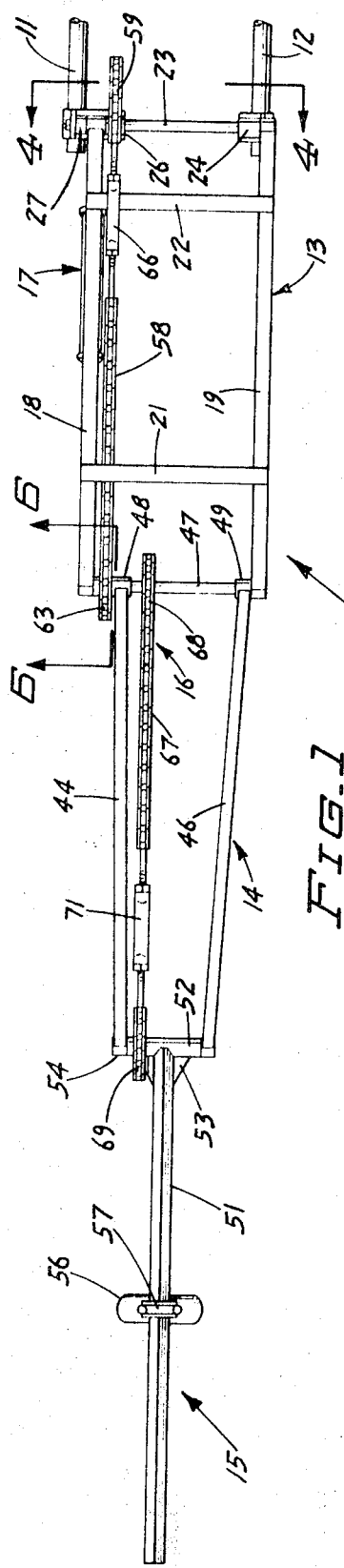
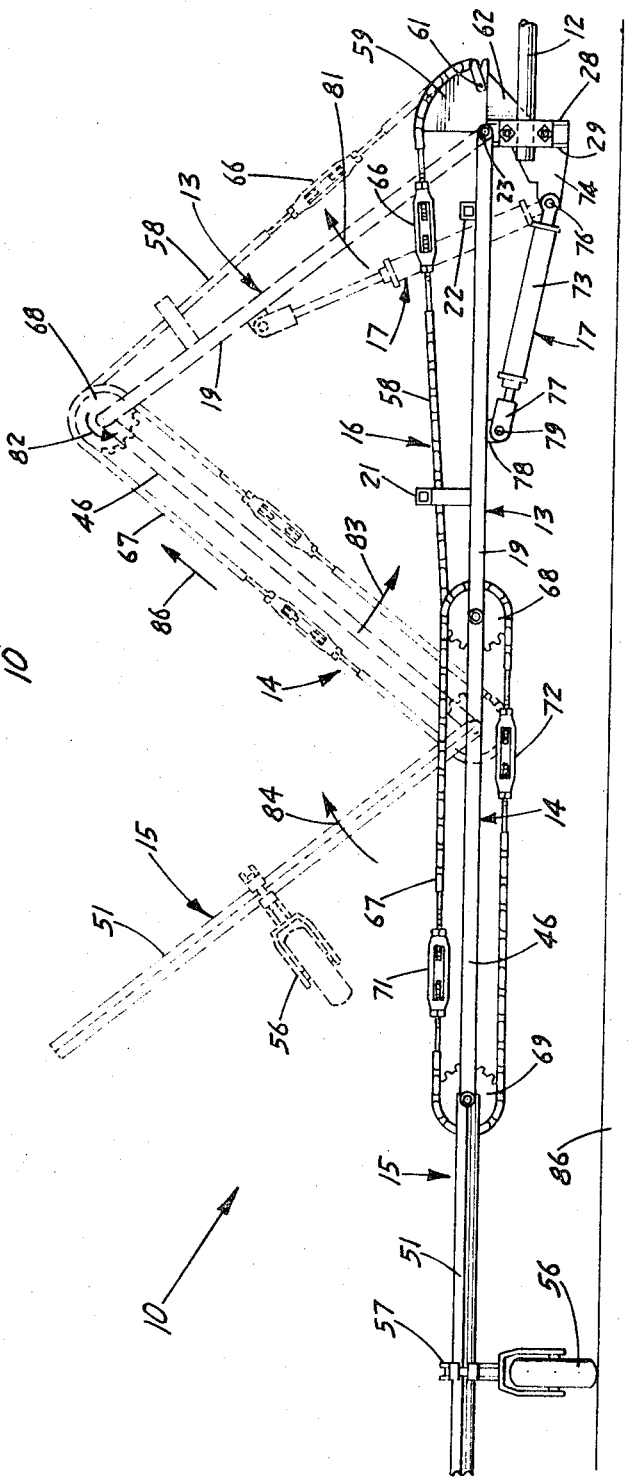

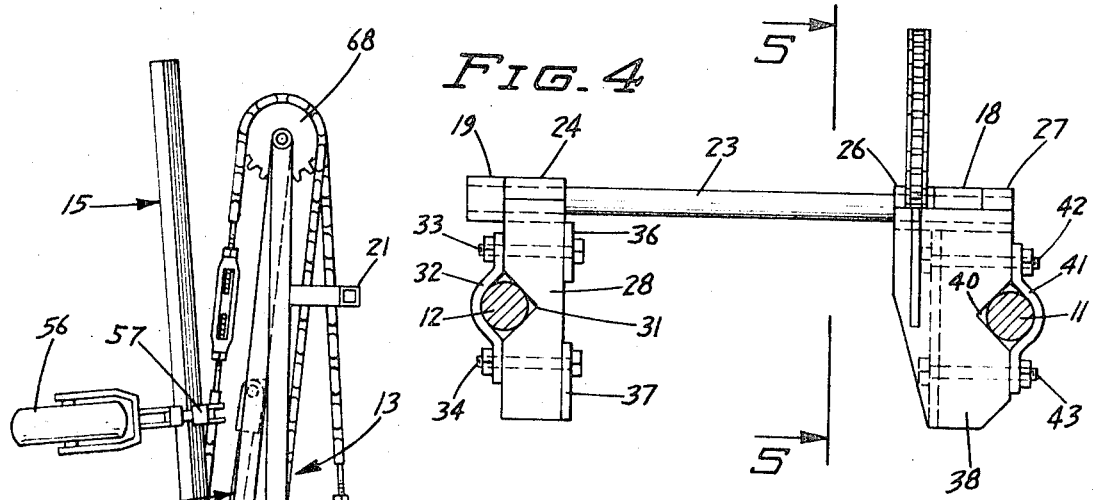
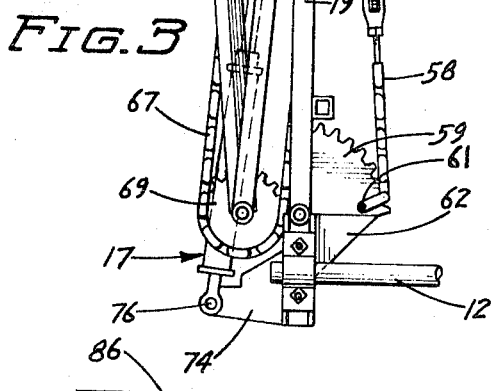
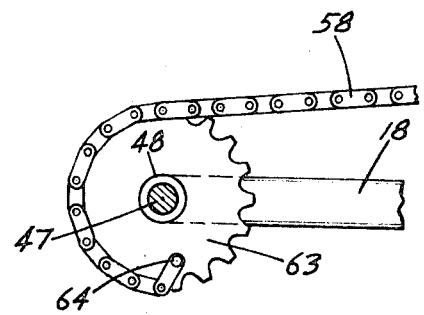
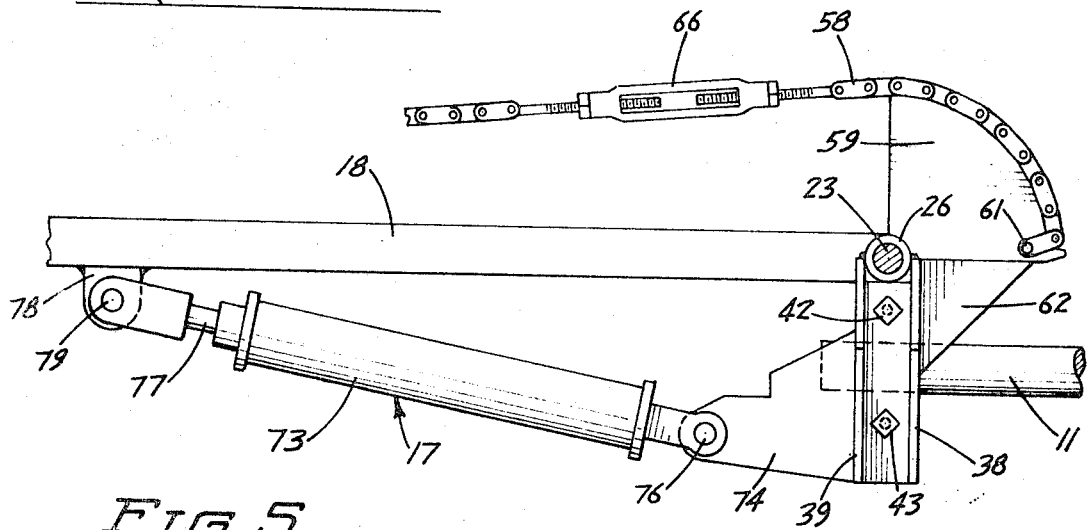

FOLDING BOOM ASSEMBLY

BACKGROUND OF THE INVENTION

Non-folding boom assemblies carrying row markers are used with agricultural implements to form guide furrows or linear marks in the soil. The non-folding assemblies have substantial length and have been raised and lowered with hydraulic cylinders. Examples of these types of markers are shown by Martin in U. S. Pat. No. 3,158,204 and Day in U. S. Pat. No. 3,250,333. Folding row markers have been developed to reduce the overhead and lateral clearnace problems of the marker. Examples of laterally foldable arm assemblies carrying a row marker are shown by White in U. S. Pat. No. 1,911,218 and Yerkes U. S. Pat. No. 3,072,200. The lateral length of the marker is limited by the combined length of the two sections of the arm assembly. A panograph-type arm assembly carrying a marker was developed by Cook, as shown in his U. S. Pat. No. 1,046,559.

SUMMARY OF THE INVENTION

The invention is directed to a folding boom assembly that has three pivotally related boom sections. The pivotal relationship of the boom sections is controlled by a power transmitting mechanism coupled to the boom sections. A power unit is operable to move a first boom section from a generally horizontal position to a generally upright position. When the first boom section is moved, the power transmitting mechanism causes the remaining two boom sections to fold in a generally upright position adjacent the first boom section. The power transmitting mechanism has a first elongated member having one end attached to a fixed member and the opposite end attached to a member fixed to the second boom section. A second elongated member is operatively connected to the first section and the third section. The first elongated member and the second elongated member function in conjunction with the movement of the first boom section to fold the second and third boom sections adjacent the first boom section in an upright side-by-side position.

IN THE DRAWINGS

FIG. 1 is a top plan view of the folding boom assembly of the invention mounted on fixed supports;

FIG. 2 is a side elevational view of FIG. 1 with the boom assembly partially folded, illustrated in broken lines;

FIG. 3 is a side elevational view of the boom assembly in its folded position;

FIG. 4 is an enlarged sectional view of the boom assembly taken along line 4—4 of FIG. 1;

FIG. 5 is a sectional view taken along line 5—5 of FIG. 4; and

FIG. 6 is a sectional view taken along line 6—6 of FIG. 1.

Referring to the drawings, there is shown in FIGS. 1 and 2 the folding boom assembly of the invention, indicated generally at 10, mounted on a support structure. The support structure is shown as a pair of fixed members 11 and 12. The members 11 and 12 may be the frame of a row crop planter, grain drill, or similar implement as shown, for example, in U. S. Patents No. 1,911,218, No. 3,158,204 and No. 3,250,333. The supports 11 and 12 can also be the frame structure of spraying equipment used to apply chemicals to the soil, vegetation or crops. In use, a pair of folding boom assemblies are attached to opposite ends of supports 11 and 12 or on opposite sides of the implement, as shown in U. S. Pat. No. 3,250,333.

The folding boom assembly 10 has three pivotally interrelated boom sections indicated generally at 13, 14 and 15. The sections 13, 14 and 15 are positionable in a generally extended horizontal end-to-end position over the ground, as shown in FIGS. 1 and 2, and are movable to a generally upright folded side-by-side position, as shown in FIG. 3. Section 13 is a first or base section that is pivotally connected to supports 11 and 12. Pivotally mounted on the base section 13 is a second or intermediate section 14. The third or outer end section 15 is pivotally mounted on the outer end of the second section 14. The power transmitting mechanism, indicated generally at 16, operatively couples the first, second and third boom sections 13, 14 and 15 together to control the relative articulate movements of the sections. An expandable power means, as a fluid motor, hydraulic ram, hydraulic cylinder or expandable power unit, indicated generally at 17, is operable to control the movement of the folding boom assembly 10 from the generally horizontal position shown in FIG. 1 to the folded position shown in FIG. 3.

The base section 13 comprises a pair of elongated side rails or members 18 and 19. Spaced cross bars 21 and 22 extend between and are secured at their opposite ends to the side rails 18 and 19. A transverse rod 23 is secured to the inner ends of side rails 18 and 19. The rod is rotatably mounted in sleeve bearings 24, 26 and 27 which rotatably mount the base section 13 about a generally horizontal axis extended in the direction of movement of the boom assembly.

As shown in FIGS. 2 and 4, a pair of downwardly directed side plates 28 and 29 have their upper ends secured to the sleeve bearing 24. The outside edges of plates 28 and 29 have outwardly open V notches 31 for receiving the support 12. A clamp 32 extends about the outside of the support 12 and is attached to the plate 29 with a pair of nut and bolt assemblies 33 and 34. Cross plates 36 and 37 have suitable holes for the nut and bolt assemblies 33 and 34 so that the clamp 32 fixes the plates 28 and 29 to the support 12.

As shown in FIGS. 5 and 6, a second pair of generally upright plates 38 and 39 are secured at their upper ends to the sleeve bearings 26 and 27. The plates 38 and 39 have outwardly directed V notches 40 for accommodating the support 11. A clamp 41 carrying nut and bolt assemblies 42 and 43 extends about the support 11 to hold the plates 38 and 39 in fixed relation to the support 11. The upper ends of the plates 38 and 39 have middle notches for accommodating the inner end of side rail 18.

Returning to FIGS. 1 and 2, the second boom section 14 has a pair of outwardly directed side rails or members 44 and 46. The inner ends of rails 44 and 46 are rotatably mounted on a transverse rod 47 with sleeve bearings or tubular members 48 and 49. The opposite ends of rods 47 are secured to the outer ends of rails 18 and 19 of the first boom section 13. The side rails 44 and 46 converge in an outwardly direction and are joined at their outer ends with a transverse rod 54.

The third or outer end section 13 comprises a single elongated bar 51. Secured to the inner end of bar 51 is a transverse sleeve bearing 52. Sleeve bearing 52 is rotatably mounted on the rod 54. Gusset braces 53 join the inner end of the bar 51 to the bearing 52.

A ground engaging wheel assembly 56 is mounted on the bar 51. An adjustable clamp 57 is used to attach the wheel assembly 56 to bar 51. Additional earth working tools or marker structures can be attached to bar 51 along its length so that one or more marks or furrows can be made in the soil.

As shown in FIG. 6, the power transmitting mechanism 16 has a first elongated member of link chain 58 and a second elongated member or link chain 67. One end of chain 58 is located over a portion of a gear 59. A gusset plate 62 secures the gear 59 to plate 38. The gear 59 is also secured to sleeve bearing 26. A pin 61, or similar suitable fastener, attaches the chain 58 to the gear 59. As shown in FIG. 6, the opposite end of chain 58 is trained about a gear 63 mounted on sleeve bearing 48. A fastener 64, as a pin or bolt, fixes the chain to gear 63. The chain 58 includes a turnbuckle 66 operable to vary the length of the chain 58, thereby controlling the pivotal angle between the first boom section 13 and the second boom section 14.

As shown in FIGS. 1 and 2, the second elongated member or chain 67 connects rod 47 with the tubular bearing 52. Chain 67 is trained about a first gear 68 secured to rod 47. The opposite end of chain 67 is trained about a gear 69 secured to the sleeve bearing 52. The chain 67 has a pair of turnbuckles 71 and 72 operable to adjust opposite segments of the chain and thereby control the pivotal relationship and alignment of second boom 14 and third boom section 15 relative to each other.

As shown in FIG. 5, the expandable power unit or fluid motor, indicated generally at 17, comprises a hydraulic cylinder 73 attached to a fixed bracket 74 with a pivot pin 76. The bracket 74 is secured to the fixed plate 29 and projects outwardly therefrom. The cylinder 73 carries a movable rod 77. The outer end of rod 77 is pivotally connected to a downwardly directed ear 78 with a pin 79. Ear 78 is fixed to the bottom side of the side rail 18.

In use, the fluid motor 17 holds the first boom section 13 in a generally horizontal position above the top of ground 86, as shown in FIG. 2. On extension or operation of the fluid motor 17, the first boom section 13 is pivoted in an upward direction, as shown in broken lines and arrow 81 in FIG. 2. The boom section 13 pivots about the axis of the transverse rod 23. The first chain 58, being anchored to gear 59 at a position spaced from the axis of rotation, permits the gear 68 to rotate in the direction of arrow 82. This allows the second boom section 14 to swing inwardly in the direction of arrow 83 until the second boom section 14 is in side-by-side relation with the first section 13, as shown in FIG. 3.

The third section 15 pivots upwardly in the direction of arrow 84. The second chain 67, being trained about the gears 68 and 69, moves in the direction of arrow 86. This folding action continues as the fluid motor 17 is expanded. As shown in FIG. 3, when the boom assembly 10 is in the folded position, the first, second and third sections 13, 14 and 15 are in a generally upright side-by-side relationship.

On contraction of the fluid motor 17, the boom assembly 10 will unfold to the horizontal position, as shown in FIG. 2. The boom section 13 is held in the horizontal position with fluid motor 17. The power transmitting mechanism 16 holds the second and third sections 14 and 15 respectively in generally horizontal alignment with the first section 13. The end of the third section 15 is supported with a ground engaging wheel 56.

Earth marking tools, as rotatable discs and shovels, can be attached to the bar 51 so that they mark the ground 86. The boom sections 13, 14 and 15 can carry a plurality of spray nozzles or other fluid dispensing units whereby the boom assembly is used with a fluid spraying machine.

While there has been shown and described a preferred embodiment of the invention, it is understood that various changes in the linkages and boom structures may be made by those skilled in the art without departing from the spirit of the invention. The invention is described in the following claims.

The embodiments of the invention in which an exclusive property or privelege is claimed are defined as follows:

1. A folding boom assembly mountable on a support comprising:
   a first boom section having a first end and second end;
   means for pivotally mounting the first end of the first end of the first boom section to said support for pivotal movement of said first boom section from a generally horizontal position to a generally upright position;
   expandable means connected to the first boom section to control the pivoting of the first boom section;
   a second boom section having a first end and second end;
   means pivotally connecting the first end of the second boom section with the second end of the first boom section;
   a third boom section having a first end and second end;
   means pivotally connecting the first end of the third boom section with the second end of the second boom section;
   power transmitting mechanism coupling the boom sections to fold the second and third boom sections adjacent the first boom section in response to movement of the first boom section by the expandable means to its generally upright position, said power transmitting mechanism including an elongated first member having a first portion attached to a fixed member and a second portion attached to a member fixed to the first end of the second boom section,
   and an elongated second member having a first portion attached to the second end of the first boom section and the first end of the third boom section, said second member being a chain trained over a first gear secured to a shaft attached to the second end of the first boom section and a second gear attached to the first end of the third boom section.

2. The folding boom assembly of claim 1 wherein: said first boom section has a pair of elongated side rails and a transverse rod secured to the outer end of the side rails.

3. The folding boom assembly of claim 2 wherein: the second boom section has a pair of elongated side rails, said side rails of the second boom section being secured to means for pivotally mounting the side rails to the rod.

4. The folding boom assembly of claim 1 wherein: the third boom section comprises an elongated linear bar and means pivotally mounting one end of the bar to the second end of the second boom section.

5. The folding boom assembly of claim 4 wherein: the second boom section has a transverse rod at the second end thereof, said means of the third boom section is pivotally mounted on said rod.

6. The folding boom assembly of claim 1 wherein: said expandable means comprises an expandable and contractible hydraulic cylinder.

7. The folding boom assembly of claim 1 wherein: the elongated first member is a chain and the fixed member is a gear.

8. The folding boom assembly of claim 1 wherein: the fixed member is attached to the means mounting the first boom section to the support.

9. The folding boom assembly of claim 1 wherein: the power transmitting mechanism includes an elongated member having a first portion attached to a fixed member and a second portion attached to a member fixed to the second boom section.

10. The folding boom assembly of claim 9 wherein: the fixed member is attached to the means mounting the first boom section to the support.

11. The folding boom assembly of claim 1 wherein: the mounting means for attaching the first boom section to the support includes means connected to the expandable means.

12. The folding boom assembly of claim 1 including: ground engaging wheel means mounted on the third boom section.

13. A folding boom assembly mountable on a support comprising: a first boom section having a first end and a second end; means for pivotally mounting the first end of the first boom section to said support for pivotal movement of said first boom section from a generally horizontal position to a generally upright position; expandable means connected to the first boom section to control the pivoting of the first boom section; a second boom section having a first end and a second end and a transverse rod secured to the second end thereof; means pivotally connecting the first end of the second boom section with the second end of the first boom section; a third boom section having a first end and a second end; means pivotally connecting the first end of the third boom section to the transverse rod of the second boom section; and power transmitting means coupling the boom sections to fold the second and third boom sections adjacent the first boom section in response to movement of the first boom section by the expandable means to its generally upright position, said power transmitting means including an elongated chain having a first portion attached to a fixed gear and a second portion attached to a member fixed to the first end of the second boom section, and an elongated second member having a first portion attached to the second end of the first boom section and the first end of the third boom section.

14. The folding boom assembly of claim 13 wherein: said first boom section has a pair of elongated side rails and a transverse rod secured to the outer end of the side rails.

15. The folding boom assembly of claim 14 wherein: the second boom section has a pair of elongated side rails, said side rails of the second boom section being secured to means for pivotally mounting the side rails to the rod.

16. The folding boom assembly of claim 13 wherein: said power means comprises an expandable and contractible hydraulic cylinder.

17. The folding boom assembly of claim 13 wherein: the elongated second member is a chain trained over a first gear secured to a shaft attached to the second end of the first boom section and a second gear attached to the first end of the third boom section.

18. The folding boom assembly of claim 13 wherein: the fixed gear is attached to the means mounting the first boom section to the support.

19. A folding boom assembly mountable on a support comprising: a first boom section having a first end and second end; first means for pivotally mounting the first end of the first boom section to said support for pivotal movement of said first boom section from a generally horizontal position to a generally upright position; power means connected to the first boom section to control the pivotal movement of the first boom section between the horizontal position and upright position; a second boom section having a first end and second end and a transverse rod at the second end thereof; second means pivotally connecting the first end of the second boom section with the second end of the first boom section; a third boom section comprising an elongated linear bar having a first end and second end; third means pivotally connecting the one end of the bar with the second end of the second boom section, said third means being pivotally mounted on said transverse rod; and power transmitting means connected to the second means, third means, and a fixed means for controlling the positions of the second and third boom sections, said power transmitting means operable to fold the second and third boom sections adjacent the first boom section in response to movement of the first boom section by the power means to its generally upright position.

20. The folding boom assembly of claim 19 wherein: said power means comprises an expandable and contractible hydraulic cylinder.

21. The folding boom assembly of claim 19 wherein: the power transmitting means includes an elongated first member having a first portion attached to a fixed member and a second portion attached to a member fixed to the first end of the second boom section, and an elongated second member having a first portion attached to the second end of the first boom section and the first end of the third boom section.

22. The folding boom assembly of claim 21 wherein: the elongated second member is a chain trained over a first gear secured to a shaft attached to the second end of the first boom section and a second gear attached to the first end of the third boom section.

23. The folding boom assembly of claim 19 wherein: the power transmitting means includes an elongated member having a first portion attached to a fixed member and a second portion attached to a member fixed to the second boom section.

24. The folding boom assembly of claim 19 wherein: the mounting means for attaching the first boom section to the support includes means connected to the power means.

25. A folding boom assembly mountable on a support comprising: a first boom section having a first end and second end; first means for pivotally mounting the first end of the first boom section to said support for pivotal movement of said first boom section from a generally horizontal position to a generally upright position; power means connected to the first boom section to control the pivotal movement of the first boom section between the horizontal position and upright position; a second boom section having a first end and second end; second means pivotally connecting the first end of the second boom section with the second end of the first boom section; a third boom section having a first end and second end; third means pivotally connecting the first end of the third boom section with the second end of the second boom section; and power transmitting means connected to the second means, third means, and a fixed means for controlling the positions of the second and third boom sections, said power transmitting means operable to fold the second and third boom sections adjacent the first boom section in response to movement of the first boom section by the power means to its generally upright position; and ground engaging wheel means mounted on the third boom section.

26. The folding boom assembly of claim 25 wherein: said first boom section has a pair of elongated side rails and a transverse rod secured at the outer end of the side rails.

27. The folding boom assembly of claim 26 wherein: the second boom section has a pair of elongated side rails, said side rails of the second boom section being secured to means for pivotally mounting the side rails to the rod.

28. The folding boom assembly of claim 25 wherein: the third boom section comprises an elongated linear bar and means pivotally mounting one end of the bar to the second end of the second boom section.

29. The folding boom assembly of claim 25 wherein: the power transmitting means includes an elongated first member having a first portion attached to a fixed member and a second portion attached to a member fixed to the first end of the second boom section, and an elongated second member having a first portion attached to the second end of the first boom section and first end of the third boom section.

* * * * *